US008898094B2

(12) United States Patent
Ruehle

(10) Patent No.: US 8,898,094 B2
(45) Date of Patent: Nov. 25, 2014

(54) NFA CHARACTER CLASS MATCHING

(71) Applicant: LSI Corporation, Milpitas, CA (US)

(72) Inventor: Michael Ruehle, Albuquerque, NM (US)

(73) Assignee: LSI Corporation, San Jose, CA (US)

( * ) Notice: Subject to any disclaimer, the term of this patent is extended or adjusted under 35 U.S.C. 154(b) by 283 days.

(21) Appl. No.: 13/659,122

(22) Filed: Oct. 24, 2012

(65) Prior Publication Data

US 2014/0114996 A1 Apr. 24, 2014

(51) Int. Cl.
G06F 15/18 (2006.01)

(52) U.S. Cl.
USPC .......................................................... 706/12

(58) Field of Classification Search
None
See application file for complete search history.

(56) References Cited

U.S. PATENT DOCUMENTS

| 7,024,511 | B2 * | 4/2006 | Ruehle ........................... 710/316 |
| 7,873,509 | B1 * | 1/2011 | Budzinski ........................ 704/9 |
| 8,014,591 | B2 * | 9/2011 | Baker ............................ 382/159 |
| 8,015,208 | B2 * | 9/2011 | McMillen ...................... 707/791 |
| 8,180,147 | B2 * | 5/2012 | Baker ............................ 382/159 |
| 8,190,738 | B2 * | 5/2012 | Ruehle ........................... 709/224 |
| 8,219,508 | B2 * | 7/2012 | McMillen et al. .............. 706/12 |
| 8,331,656 | B2 * | 12/2012 | Baker ............................ 382/159 |
| 8,331,657 | B2 * | 12/2012 | Baker ............................ 382/159 |
| 8,347,384 | B1 * | 1/2013 | Preston .......................... 726/23 |
| 8,386,530 | B2 * | 2/2013 | McMillen ...................... 707/802 |
| 8,392,174 | B2 * | 3/2013 | Cameron ......................... 704/9 |
| 8,396,295 | B2 * | 3/2013 | Gao et al. ...................... 382/187 |
| 8,448,249 | B1 * | 5/2013 | Preston .......................... 726/24 |
| 8,688,436 | B1 * | 4/2014 | Budzinski ........................ 704/9 |
| 8,843,508 | B2 * | 9/2014 | Thorup et al. ................. 707/769 |

OTHER PUBLICATIONS

High-Performance and Compact Architecture for Regular Expression Matching on FPGA, Yang, Y.-H.E. ; Prasanna, V.K. Computers, IEEE Transactions on vol. 61 , Issue: 7 DOI: 10.1109/TC.2011.129 Publication Year: 2012 , pp. 1013-1025.*

NFA-Based Pattern Matching for Deep Packet Inspection, Yan Sun ; Valgenti, V.C. ; Min Sik Kim Computer Communications and Networks (ICCCN), 2011 Proceedings of 20th International Conference on DOI: 10.1109/ICCCN.2011.6006095 Publication Year: 2011 , pp. 1-6.*

Min-Max: A Counter-Based Algorithm for Regular Expression Matching, Hao Wang ; Shi Pu ; Knezek, G. ; Jyh-Charn Liu Parallel and Distributed Systems, IEEE Transactions on vol. 24 , Issue: 1 DOI: 10.1109/TPDS.2012.116 Publication Year: 2013 , pp. 92-103.*

\* cited by examiner

Primary Examiner — Michael B Holmes

(57) ABSTRACT

Disclosed is method of matching a character class to a symbol of an input stream. A character class, or a plurality of character classes, is defined into an accessible format which when accessed is compared to a symbol in an input stream. The format may be stored in an NFA array cell or it may be broadcast to the cell array with an input symbol for comparison.

16 Claims, 7 Drawing Sheets

200

230   220
       210

| Hex BCL [19:0] | BCF [19:18] | NE [9] | CL [8] | Description | Regex | Notes |
|---|---|---|---|---|---|---|
| 000-0FF | 0 | 0 | 0 | literal byte | [a] | matches one byte |
| 100 | 0 | 0 | 1 | anything | (?=) | always matches |
| 101 | 0 | 0 | 1 | EOL | $ | newline or EOS |
| 102 | 0 | 0 | 1 | EOP | \y | end of packet |
| 103 | 0 | 0 | 1 | EOS | \z | end of stream |
| 104 | 0 | 0 | 1 | EOS2 | \Z | EOS or NL before EOS |
| 105-107 | 0 | 0 | 1 | reserved | | |
| 108 | 0 | 0 | 1 | WB | \b | word boundary |
| 109 | 0 | 0 | 1 | WB+EOL | \b$ | EOL at word boundary |
| 10A | 0 | 0 | 1 | WB+EOP | \b\y | EOP at word boundary |
| 10B | 0 | 0 | 1 | WB+EOS | \b\z | EOS at word boundary |
| 10C | 0 | 0 | 1 | WB+EOS2 | \b\Z | EOS2 at word boundary |
| 10D-140 | 0 | 0 | 1 | reserved | | |
| 141-15A | 0 | 0 | 1 | caseless | [aA] | 1'A' - 1'Z' |
| 15B-17F | 0 | 0 | 1 | reserved | | |
| 180-1FF | 0 | 0 | 1 | table | [T(i)] | address i = N[6:0] |
| 200-2FF | 0 | 1 | 0 | inverse literal | [^a] | any byte except one |
| 300 | 0 | 1 | 1 | empty class | (?!) | never matches |
| 301 | 0 | 1 | 1 | dot | . | not newline |
| 302 | 0 | 1 | 1 | dotall | [\x00-\xFF] | any byte |
| 303-340 | 0 | 1 | 1 | reserved | | |
| 341-35A | 0 | 1 | 1 | inverse caseless | [^aA] | 3'A' - 3'Z' |
| 35B-37F | 0 | 1 | 1 | reserved | | |
| 380-3FF | 0 | 1 | 1 | inverse table | [^T(i)] | address i = N[6:0] |
| 80000 – BFFFF | 2 | 0 | 0 | 2-Char | [ab] | 2C Matches Byte [7:0] or Alt [17:10], Byte > Alt |
| | 2 | 0 | 1 | caseless 2C | [aAbB] | |
| | 2 | 1 | 0 | inverse 2C | [^ab] | |
| | 2 | 1 | 1 | inv. caseless 2C | [^aAbB] | |
| C0000 – FFFFF | 3 | 0 | 0 | range | [a-z] | Range matches Byte [7:0] to Alt [17:10], Byte < Alt |
| | 3 | 0 | 1 | caseless range | [a-zA-Z] | |
| | 3 | 1 | 0 | inverse range | [^a-z] | |
| | 3 | 1 | 1 | inv. caseless range | [^a-zA-Z] | |

| Hex Range | DF | Description | Example | Notes |
|---|---|---|---|---|
| 0000-03FF | 0 | Core BCL | [^aA] | Any 10-bit byte class code |
| 0400-07FF | 0 | reserved | | |
| 0800-0FFF | 1 | Full Mask | [a-z\xff] | 256-bit mask, any real class |
| 1000-17FF | 2 | ASCII | [0-9a-z] | 128-bit mask for \x00-\x7f, and \x80-\xff never match |
| 1800-1FFF | 3 | Neg. ASCII | [^0-9a-z] | 128-bit mask for \x00-\x7f, and \x80-\xff always match |

NFA CHARACTER CLASS MATCHING

BACKGROUND OF THE INVENTION

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example. Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols like SMTP, MIME, HTTP and FTP on top of low level protocols like TCP, IP or MAP. Further, instructions in other languages may be included with these standards, such as Java and Visual Basic. As information is transported across a network, there are numerous instances when information may be interpreted to make routing decisions. Information may also be interpreted and acted on in other fashions. It is common for protocols to be organized in a manner resulting in protocol specific headers and unrestricted payloads. Subdivision of the packet information into packets and providing each packet with a header may also occur. This enables the routing information to be at a fixed location thus making it easy for routing hardware to find and interpret the information.

SUMMARY OF THE INVENTION

An embodiment of the invention may therefore comprise a method of matching character classes (CCLs) from an NFA in an NFA cell array, the method comprising encoding information of at least one frequent CCL in a frequent CCL table, accessing a location in the frequent CCL table indicated by an input symbol, broadcasting the content of that location, which is a membership vector, to each cell in the NFA cell array, broadcasting the input symbol to each cell in the NFA cell array, and in an NFA cell, using the encoded frequent CCL to select a bit in the membership vector, the bit indicating membership in the frequent CCL.

An embodiment of the invention may further comprise a system of matching character classes (CCLs) from an NFA in an NFA cell array, the system comprising a frequent CCL table, an input stream comprising a plurality of input symbols, a loader enabled to receive NFA instructions and configure the NFA cells, and a plurality of NFA cells enabled to receive information from the frequent CCL table, loader and input stream, wherein the input stream provides symbols to the frequent CCL table and the NFA cells, the frequent CCL table utilizes the input symbol to access a membership vector, the membership vector and symbols from the input stream are broadcast to each cell in the NFA cell array, and a bit from the membership vector is selected to determine membership in a CCL.

BRIEF DESCRIPTION OF THE DRAWINGS

FIG. 2 is a table of Byte Class (BCL) codes.
FIG. 4 is a table for Dictionary Class (DCL) codes.

DETAILED DESCRIPTION OF THE EMBODIMENTS

Figure 1:
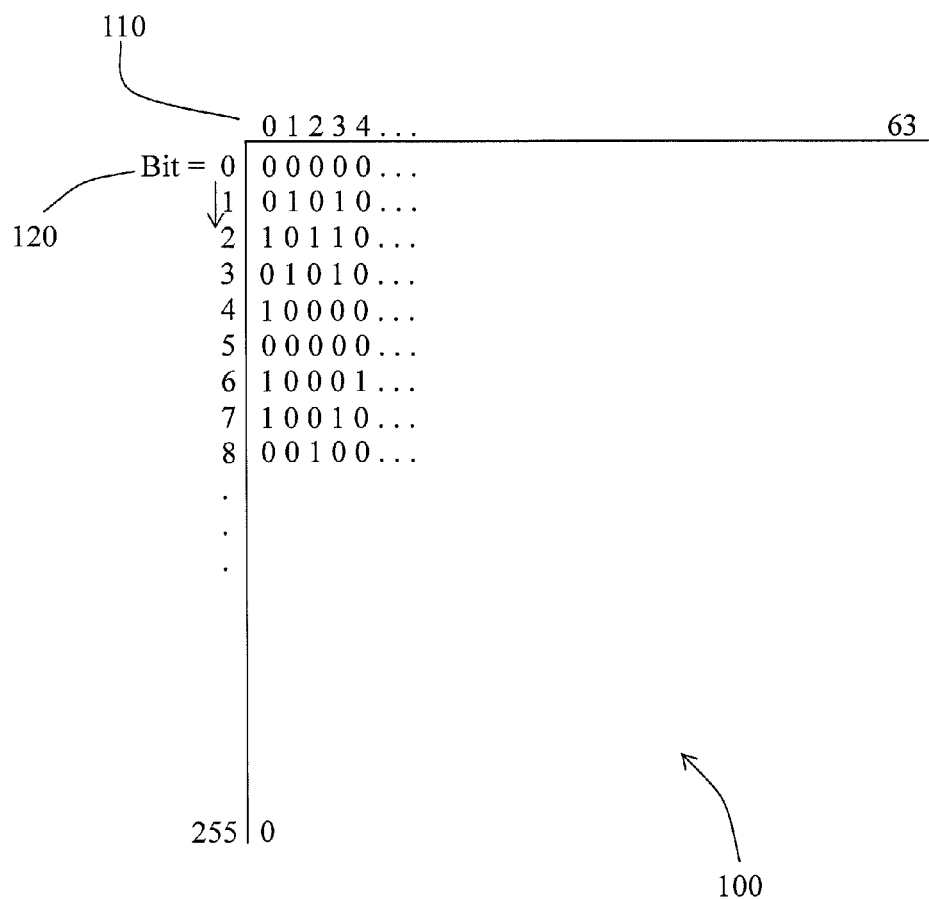
FIG. 1 is a table representing a frequent CCL table.

With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature.

The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

Performing lexical analysis or pattern matching is generally a computationally expensive step. This is because every symbol of information needs to be examined and dispositioned.

Regular expressions are well known in the prior art and are used for pattern matching and lexical analysis. Regular expressions provides a concise and flexible means for "matching" string of text, such as particular characters, words, or patterns of characters. Abbreviations for "regular expression" include "regex" and "regexp" and these abbreviations may be used throughout this specification interchangeably with each other and with the term "regular expression". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings Examples of specifications that could be expressed in a regular expression are as follows:

- the sequence of characters "car" appearing consecutively in any context, such as in "car", "cartoon", or "bicarbonate"
- the sequence of characters "car" occurring in that order with other characters between them, such as in "Icelander" or "chandler"
- the word "car" when it appears as an isolated word
- the word "car when preceded by the word "blue" or "red"
- the word "car" when not preceded by the word "motor"
- a dollar sign immediately followed by one or more digits, and then optionally a period and exactly two more digits (for example, "$100" or "$245.98").

These sequences are simple and are intended only for purposes of example. Specifications of great complexity are conveyable by regular expressions, as well as by other types of rule sets.

Regular expressions are used by many text editors, utilities, and programming languages to search and manipulate text based on patterns. Some of these languages, including Perl, Ruby, AWK, and Tcl and may integrate regular expressions into the syntax of the core language itself. Other programming languages like .NET languages, Java, and Python provide regular expressions through standard libraries.

Regular expressions, and other types of rulesets, typically comprise terms and operators. A term may include a single symbol or multiple symbols combined with operators. Terms may also be recursive, so a single term may include multiple terms combined by operators. In dealing with regular expressions, three operations are defined, namely, juxtaposition, disjunction, and closure. In more modern terms, these operations are referred to as concatenation, selection, and repetition, respectively. Concatenation is implicit; one term is followed by another. Selection is represented by the logical OR operator which may be signified by a symbol, such as '|'. When using the selection operator, either term to which the operator applies will satisfy the expression. Repetition is represented by '*', which is often referred to as a Kleene star. The Kleene star, or other repetition operator, specifies zero or more occurrences of the term upon which it operates. Parentheses may also be used with regular expressions to group terms. Description of certain other regular expression nomenclatures is provided below. It is understood that below provides a selection of nomenclatures and there may be more such nomenclatures, depending on the ruleset utilized.

A "character class" or "symbol class" is a set of characters that will find a match if any one of the characters included in the set matches. For example, the character class [A-Z0-9#$%] matches any single character from A-Z, 0-9, or the characters '#', '$', and '%'. Similarly, the character class [aeiou] matches any single character included in the specified set of characters, i.e. any vowel in the English language. A term of a regular expression may comprise character classes in the same manner as symbols, i.e. a single character class or multiple character classes and/or symbols combined by operators. Indeed, a symbol within a term may be considered as a special case of a character class, e.g. the symbol 'x' is equivalent to the character class [x].

A "universal character class" matches any characters in an available character set. For example, a universal character class may be represented using [\x00-\xFF] (assuming characters are represented using 8 bits) or '.'.

A "negated character class" is a set of characters that will find a match if any one of the characters not included in the set matches. For example, the character class [^aeiou] matches any single character not in the character class [aeiou].

To match regular expressions or similar pattern matching rules, two main types of state machines may be constructed, nondeterministic and deterministic finite automata (NFAs and DFAs). NFAs for multiple rules are commonly executed separately, either in a sequential manner as in software, or in a parallel manner as in hardware.

Abstractly, an NFA is a directed graph of NFA states, in which each graph edge is labeled with a class of input symbols that it accepts, representing a transition from a source state to a destination state on that symbol class. One or more "start states" are understood to be "active" at the beginning of a stream (or sequence) of input symbols or characters. As each symbol in the stream is consumed, an active state may transition to a destination state along a graph edge labeled with a class containing that symbol, so that the destination state becomes active after that symbol. The class of symbols labeling an NFA transition may be called a character class, or CCL, as discussed above. An NFA may be constructed to match one or more regular expressions or similar rules, with states and transitions corresponding to the rules such that some state will be active if the input symbols so far consumed form the beginning of a possible match to some rule. Each rule corresponds to at least one special "accepting state," which becomes active when the rule has been completely matched by the input symbols consumed. Typically, but not universally, CCLs labeling NFA transitions correspond to CCLs and symbols appearing in the regular expressions which the NFA was constructed to match.

Various distinct NFAs may generally be constructed to match the same rule or set of rules. Such NFAs may have different graphs, but still be functionally equivalent in the sense that appropriate accepting states become active in each equivalent NFA after consuming symbols matching any of the rules. Also, NFA graphs may have "epsilon transitions" or "epsilons", often drawn as graph edges labeled with a Greek letter Epsilon ($\epsilon$) instead of a symbol class. Unlike ordinary transitions, epsilon transitions are followed without consuming any input symbol. Epsilons are useful for many algorithms, but well known algorithms can transform any NFA into an equivalent epsilon-free NFA.

Unlike in a DFA, a single NFA state may have multiple out-transitions labeled with classes containing the same symbol. When such a state is active, and such a common symbol is consumed, there are multiple out-transitions that could be taken, and there is no fixed way to determine which transition to take. This is the "non-deterministic" aspect of an NFA. Depending on input symbols not yet consumed, one of these possible transitions may lead to an accepting state while another does not, so to detect all matches it is important to take the right transition.

According to the "Thompson" method of executing NFAs, as each input symbol is consumed, all transitions from each active sate, which are labeled with CCLs containing (or "matching") the symbol are taken together, potentially activating multiple destination states at once. A hardware NFA engine may be constructed to execute NFAs avoiding to the Thompson method. In such an engine, multiple NFA cells exist as physical logic within a cell array, where each cell is configured to track one or more NFA states derived from the rules. The states tracked by a cell may be active or inactive, and cells are able to signal to other cells and activate them, such signals representing state transitions. The cell array is initialized with start states active, and input symbols or information corresponding to those symbols are broadcast to the cells. Logic associated with each transition is configured to detect the proper symbol class, and examines each input symbol to determine if it belongs to the transition class. Whenever a state is active and the next symbol matches a transition class, a signal is sent to the destination cell. Whenever an accepting state becomes active, a match is reported for a corresponding rule.

The cell array may be statically configured with an entire NFA before scanning an input stream, such that every NFA state is represented by some cell. Alternatively, according to the methods of U.S. Pat. No. 7,899,904 to Ruehle, which is hereby incorporated by reference in its entirety, cells may be dynamically reconfigured on demand during a scan, so that the cell array does not need to be large enough for the entire NFA. The cell array only needs to be large enough for active state subsets achieved during a scan. As taught in the '904 patent, it is advantageous for a single cell to represent more complex sub-graphs of multiple NFA states. When a cell is dynamically configured, signal connections are also configured between the cell and its destination and source states in the cell array.

For any such hardware NFA engine comprising such a cell array, whether statically or dynamically configured, it is desirable to have low-cost comparison logic within each cell to match whatever CCL is required for each state transition.

As is understood in the art, a very large number of CCLs are possible, such as 2^256 possible CCLs when the symbol alphabet is the set of 8-bit byte values 0x00 to 0xFF, and the syntax of regular expression languages and other rule languages permit arbitrary CCLs to be used. The complexity of utilized CCLs may not be known at the time the cell array is designed. In some cell array architectures, each cell may represent a sub-graph of multiple NFA states, so that multiple transition CCLs must be tested by each cell. A system for CCL matching by NFA cells may support independent arbitrary CCLs for each cell, support a large number of CCLs for a full NFA, support many transition CCLs in each cell, have low logic cost for each cell, and be able to be compactly encoded in instructions to configure each cell, and be autonomous such that each cell may match its CCLs quickly without competing for any external resource.

In some methods, standard, commonly used CCLs may be identified and hard-wired into the implementation of the cell array. Instructions to configure each cell may contain references to these standard CCLs. This can be inexpensive to implement, but may not support rules that happen to use different CCLs.

In some methods, each cell can be constructed to store a limited quantity of symbols which its transition(s) can match. Transition logic can compare the next symbol with these stored symbols. Cell transitions can match relatively simple classes containing one symbol or a small number of symbols.

In some methods, the instructions to configure each cell may contain full membership masks for each transition CCL, such as a 256-bit mask for byte characters, which may be stored in each cell. Although this may provide full coverage for all CCLs used in a ruleset, it inefficiently utilizes system resources at high cost.

Representing transition CCLs for NFA cells is disclosed herein. In an embodiment of the invention, this may be done by encoding a CCL in instructions to configure NFA cells, storing CCL information in the cells and using the stored information to compare the CCL with input symbols is disclosed. A combination of the encoding, storing and using the stored information provides strong functional coverage with cost benefits.

In an embodiment of the invention, a limited number of fixed CCLs may be defined. In an embodiment of the invention, a frequent CCL table may be used and information from the table may be provided to the cell array. In an embodiment of the invention, a dictionary table may be used and information from the table provided to the cell array. It is understood that these embodiments may be used individually or in combination—two or three.

The defining of the fixed CCLs may be at the time when the NFA cell array is implemented. Implementing an NFA cell array is understood in the art and may be either static or dynamic as discussed above. These fixed CCLs may be later referenced by corresponding fixed CCL codes. The fixed CCLs are chosen to include common CCLs or types of CCLs used in regular expressions or other rules in practice. The encodings are chosen to be compact and comparable with input symbols by low-cost cell logic.

Specific fixed CCLs may include one or more types. Fixed CCLs may comprise a single character. These single characters may be encoded using a binary representation of a single character, along with a short format code identifying the type. Fixed CCLs may also comprise any two characters. Further, fixed CCLs may comprise any range of characters from a minimum to a maximum position in a standard ordering of the symbol alphabet. In an embodiment of the invention, these may be encoded using binary representations of the two characters, or the minimum and maximum characters along with short format codes identifying the type. Also, in an embodiment of the invention, CCLs containing any single character may be encoded with shorter codes than CCLs containing any two characters or containing any range of characters. This provides an efficiency in resource utilization.

Further, fixed CCL types discussed above may be modified, in an embodiment of the invention, by single-bit code flags made part of the fixed CCL encoding. One modifying flag is Caseless (CL) and can have the effect that uppercase and lowercase variants of the character(s) are included for any character(s) in the base class where such variants may exist, e.g. alphabetic symbols. For example, the fixed single character CCL for [a] may be modified by CL to obtain [aA]. The variant here being the capital letter. It is understood that this also works in reverse, i.e. for CCL[A], the CL would also obtain [aA]. In similar fashion, for a multiple character fixed CCL, the fixed two-character CCL for [aB] may be modified by CL to obtain [abAB]. The fixed two-character CCL for [A5], as an example of a fixed CCL of a symbol with a variant and a symbol without a variant may be modified by CL to obtain [aA5]. The fixed range CCL for [a-z] may be modified by CL to obtain [a-zA-Z].

Another modifying flag is Negated (NE). This can have the effect of producing a symbol class which is the complement of the modified base CCL, i.e. it contains precisely the characters not contained by the base CCL. For example, the two character CCL for [aB] may be modified by NE to obtain [^aB]—the class containing every character except 'a' or 'B'".

CL and NE flags may be used together. For example, the two-character CCL for [aB] may be modified by NE and CL to obtain [^abAB]—the class containing every character except 'a', 'b', 'A', or 'B'.

Further, in an embodiment of the invention, fixed CCL codes may be advantageously defined to represent other common or generally useful CCLs. Also, other test codes which are not strictly symbol classes, such as position or anchor tests, or tests matching meta-symbols such as End of Packet (EOP) or End of Stream (EOS) markers which are not symbols in the base symbol alphabet are possible. Such specialized fixed CCLs (and other tests) may be encoded in the same space as single-symbol CCLs by using a different sort format code to indicate a special class, and encoding a unique index for each special CCL in place of the encoded symbol.

In an embodiment of the invention, in conjunction with fixed CCLs, or independently, a CCL method utilizes a configurable table of arbitrary CCLs. This table may be programmed with CCLs used frequently in a given set of regular expressions or other rules. This "frequent CCL" table may be of only moderate size, for example N=32 or 64 CCLs. Although N=32 or N=64 CCLs for a table size offers efficiency and cost balance, it is understood that N=128 or larger is possible depending on cost and system usage requirements. Reducing the number of supported CCLs may reduce cost, but limit utility, whereas increasing the number of CCLs may increase cost. The term "frequent" will be used throughout this description to modify CCL and CCL table. It is understood that "frequent", as used, does not necessarily imply frequency of use of the CCLs, or CCL tables, described. Accordingly, a frequent CCL does not have more or less frequency than a fixed or dictionary type CCL in a ruleset, or in the NFA cell array. Rather, the term "frequent CCL" is used to describe CCLs that are found in a CCL table, said table being used to provide membership vectors to NFA cells for match determinations with input symbols.

The frequent CCL table may be constructed such that each possible input symbol may be used to access a distinct location in the table, and each location contains an N-bit membership vector. The N-bit membership vector comprises one bit for each supported CCL—where the bit is '1' if said input symbol is a member of the corresponding class or '0' otherwise. The cell array may be constructed so that each input symbol is used to access the frequent CCL table to obtain a corresponding membership vector, and this vector is broadcast to all NFA cells along with the input symbol. Then, any cell configured to match one of the N Frequent CCLs for one of its transition classes may test that CCL by simply accessing the corresponding bit from the membership vector.

FIG. 1 is a table representing a frequent CCL table. The frequent CCL table 100 has N=64 columns 110 and 256 rows 120. As noted above, it is understood that the column 110 dimensions could vary depending on table size and type of character representation. Accordingly, a plurality of CCLs may populate the table 100 with one CCL in each column. For instance, a first CCL will populate the table 100 at the column 0 location in each row. Each of bits 0 through 255 within this column will constitute one bit of the CCL. CCLs 1 through 63 will complete the table population in like fashion. Each row of the table 100 is a 64 bit membership vector corresponding to a particular symbol in the alphabet being used. For example, using an ASCII alphabet, row 97 may be a membership vector for [a]. CCL table 100 is accessed 1 row at a time. In operation, an input symbol is used to access a corresponding row 120 in the table 100. The corresponding membership vector is retrieved. The vector is broadcast to all of the cells with the symbol.

Each row is 1 bit from each class. For example, the CCL [a-z] lends itself to a suitable illustration. Of 256 byte values, 0 to 255, the [a-z] class contains the 26 bytes from 97 to 122—using ASCII encoding. Accordingly, this class can be represented as a 256-bit mask. That mask will be represented by one column 110 in table 100. Bits will be indexed from 0 to 255 where bits 97 through 122 are set to '1' and all other bits are set to '0'. Each bit in this membership vector indicates whether that particular symbol is a member of the corresponding CCL. For example, and as mentioned in the paragraph above, any particular tow, such as row 97 (which corresponds to [a] in ASCII) would indicate which CCLs that symbol belonged to. It is understood that the symbol alphabet could be the 128 ASCII characters, which are technically 7-bit symbols or it could be an extension of the set of byte values, augmented with meta-characters such as markers for the beginning or end of a file, stream, or packet.

The compiler will populate one column of the table for the example CCL and each addition column for additional CCLs. For the example used here, the vector will have a length of 64 bits. As is understood, this vector length may be modified by having a frequent CCL table of a different size, N=32 or N=128 for example. As each symbol of an input stream is consumed, the input symbol indicates which row in the table 100 to use for CCL membership determinations. This corresponding row will provide a 64 bit membership vector which is then broadcast to each cell in the NFA cell array. As noted above, each input symbol will also be broadcast to each cell in the array. Upon receiving the broadcasts, a test is made to determine if the input symbol is a member of a relevant CCL by looking at appropriate bit locations in the membership vector.

In an embodiment of the invention, frequent CCL references may be encoded in the same space as single-symbol CCLs, by using a different short format code to indicate a frequent CCL and encoding a unique index for each frequent CCL in place of the encoded symbol, e.g. a number from 0 to N−1. Frequent CCL references may utilize the NE flag described above, so the complement of any CCL in the frequent CCL table is also available.

Fixed CCLs and frequent CCLs, in an embodiment, described above can be encoded in short binary values. FIG. 2 is a table of Byte Class (BCL) codes. The table 200 shows available BCL types. As discussed elsewhere, each BCL code is tested directly against a data byte, its position flags and its vector of class flags from the programmable table 100. Also as noted, BCLs may be inexpensive and limited to simple classes including a number (for example 64) programmable classes. For the alphabet of characters comprising 8-bit byte values 0x00 to 0xFF, it is possible to represent single-character fixed CCLs, special fixed CCLs and frequent CCL references by 10-bit "BCL" (byte class) codes comprising an 8-bit byte field, and a 1-bit CL 210 and NE 220 flags. Because only a subset of the character values have uppercase and lowercase variants (26 uppercase and 26 lowercase letters out of 256 byte values), the CL flag 210 can be overloaded to distinguish single-character CCLs from special fixed CCLs and frequent CCL references, which in turn may be distinguished by bit(s) within the Byte field. Also, two-character and range fixed CCLs for the 8-bit byte alphabet may be encoded in 20-bit BCL codes comprising two 8-bit character fields (Byte and Alt) plus CL and NE flags, plus an optional 2-bit format code (BCF) 230, which distinguishes two-character codes (BCF=2), range codes (BCF=3), and the shorter 1-bit codes extended to 20 bits (BCF=0).

Throughout this description, the term "Byte Class Codes" is used. It is understood that this term is not necessarily limited to "bytes". A "Byte Class" is understood to be a 20-bit code, or other length, representing a common, or otherwise, CCL. Codes may represent both fixed and programmable classes. Byte Class Codes may be used in various instructions for matching such NFA elements at spin, lookahead, and sequence classes. Each BCL may be split into Byte, Class Flag, Negated Flag, Alt and BCF representations. Core BCLs may be a 10-bit subset and may support literal bytes, caseless bytes, end anchors, a small table of programmable classes, and negations of these. Full BCLs may be 20-bit codes.

In an embodiment of the invention, these 20-bit BCLs may also be represented in only 18 bits, with the BCF field omitted and using an extra technique involving the comparative 8-bit Byte and Alt fields. Byte=Alt implies BCF=0, noting that 2-character and range CCLs never require identical Byte and Alt. Otherwise, Byte <Alt implies BCF=3, a range CCL from minimum=Byte to Maximum=Alt. Otherwise, Byte >Alt implies BCF=2, a two-character CCL matching Byte or Alt.

10-bit and 18/20-bit BCL codes are sufficiently compact CCL representations that several BCLs may be encoded in instructions to configure NFA cells, and several BCLs may be stored in NFA cells for transitions classes. For example, a single 128-bit instruction may contain 12 10-bit BCLs, or 6 20-bit BCLs, or may contain 2 to 4 BCLs along with other configuration data. Each NFA cell may store multiple BCLs in registers or memories. In an embodiment of the invention, the logic cost to store a 20-bit BCL in registers is approximately 200 gates, and the logic cost to compare a 20-bit BCL each cycle with an input symbol (along with an associated membership vector) is approximately 600 gates. Depending on the cell array architecture, and the suitable size and complexity of each cell, it is acceptable to store up to 16 20-bit BCLs in each cell, and compare 6 selected BCLs with input symbols each cycle, at a logic cost of approximately 6800 gates per cell. Although 20-bit BCLs may be encoded in 18 bit formats in configuration instructions, it may be advantageous to store the BCLs in NFA cells as full 20-bit BCLs so that the logic to compare with an input symbol does not need to compare the Byte and Alt fields. BCL storage in cells may allow mixed 10-bit and 20-bit BCLs, such that each 20-bit storage element may contain one 20-bit BCL or two 10-bit BCLs, as configured by instructions.

The use of BCLs as described above to represent fixed CCLs and frequent CCLs allows for supporting many transition CCLs in each cell, yet having low logic cost for each cell, being able to compactly encode CCLs in instructions to configure each cell and having autonomous CCL matching within each cell without competing for any external resource (the broadcast of input symbols and associated membership vectors is done easily without competition among cells.). But BCLs alone to not fulfill the goals of supporting independent arbitrary CCLs for each cell, or supporting a large number of CCLs for a full NFA, because BCLs are limited to the fixed CCLs and only a moderate number, e.g. N=32 or 64, of configurable CCLs in the frequent CCL table. The primary reason for this limitation is that supporting a very large frequent CCL table, e.g. 1024 entries, would impose very large logic costs to transmit 1024-bit membership vectors to each cell, and to select one bit from the 1024 to compare a BCL with an input symbol.

In an embodiment of the invention, a CCL matching methodology may comprise use of a second configurable table of arbitrary CCLs. However, this second table is a CCL dictionary. The CCL Dictionary usage may differ from the configurable table of CCLs described above. The dictionary may be enabled to hold a large number of CCLs, such as 512, 1024, 2048 or more. Sets of regular expressions or other rules for many common applications typically do not use more than several hundred distinct CCLs. Accordingly, the dictionary sizes mentioned above as examples may be adequate in most ruleset situations. A reference to any CCL in the Dictionary may be encoded in a short binary value known as a DCL (dictionary class), e.g. 11 bits long to reference up to 2048 classes. Such a DCL value may be encoded in NFA instructions with BCLs.

As noted above, the Dictionary stores classes in a "rotated" orientation compared to the frequent CCL table. This is such that any DCL value may be used to address the dictionary and access an entry for a single CCL in the dictionary. The dictionary entry may be formatted as a bit-mask, with one bit for each possible symbol value in the alphabet, e.g. a 256-bit mask for 8-bit characters. Each bit in a dictionary mask is '1' if the corresponding symbol is a member of the CCL, or '0' if not. When an NFA instruction is decoded in preparation to configure an NFA cell, each DCL value is used to retrieve an associated mask from the dictionary, and this mask is stored directly into the NFA cell being configured. The cell may compare the Dictionary CCL with an input symbol by using the symbol value as an index to select one corresponding bit from the mask. The logic cost of this DCL comparison is similar to BCL comparison—approximately 600 gates may be required to compare one mask with an input symbol each cycle.

Figure 3:
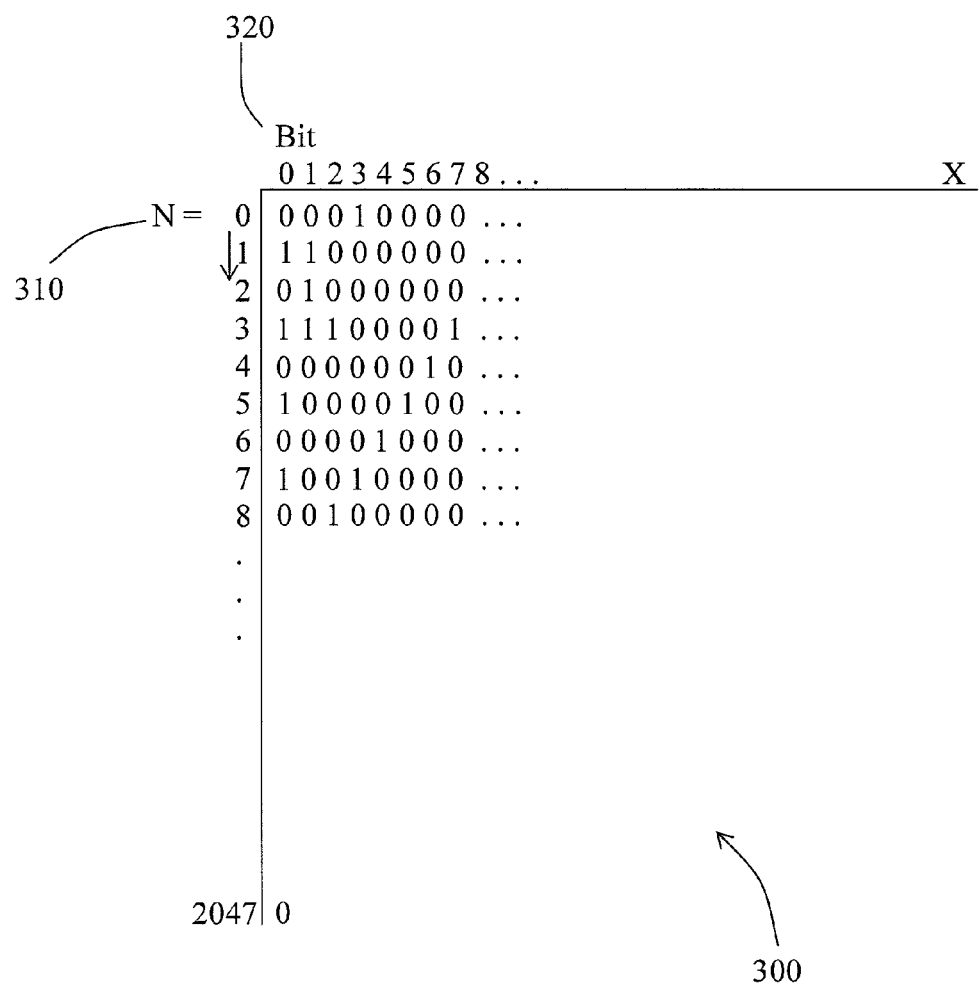
FIG. 3 is a table representing a dictionary table for CCL matching.

FIG. 3 is a table representing a dictionary table for CCL matching. A table 300 is oriented so that each row 310 contains a CCL representation. The columns 320 of the table contain the associated bit mask for each CCL. The rows 310 and columns 320 are organized and oriented in a rotated manner relative to the frequent CCL table discussed above and in connection with FIG. 1. Accordingly, as noted, each bit in a row may represent a possible symbol value in the alphabet. Also, as noted, a symbol in the input stream, which may be an 8-bit byte, may be used as an index to select one bit of the 256 bit mask. If that corresponding bit of the mask is set, then the symbol is a member of the CCL.

Referring again to FIG. 3, it is understood that cell storage requirements may be greater for Dictionary Classes (DCLs) representations compared to BCLs representations. For example, it may require 256 register bits to store a dictionary mask compared to 20 register bits to store a BCL. If each NFA cell is capable of storing and comparing CCLs for several NFA state transitions, the ratio of DCLs to BCLs can be manipulated to most efficiently utilize system resources. When instructions are encoded to configure an NFA cell comprising multiple NFA states and transitions, the instructions may include only one DCL and also an indication of which transition the DCL applies to. In this manner, using just a single DCL per cell, each cell gains the ability to match any transition CCL from the whole rule set. This is assuming the dictionary is of sufficient size to store all CCLs used by the rule set. By using a mix of several BCLs and one or a few DCLs, with frequent CCL table programmed in an efficient manner, NFA cells can typically be configured to represent almost all states or multi-state sub-graphs. If certain states or sub-graphs cannot configure into a single cell because they would need more than the available number of DCLs, these states or sub-graphs may be configured into multiple NFA cells to utilize additional DCL resources. Thus, the combination of BCLs and DCLs acceptably achieves the stated goals of CCL representation in NFA cell arrays.

Further, DCL codes may be extended to comprise not only references to the Dictionary table 200, but also some or all BCL codes. This allows an instruction to use another BCL in place of a DCL field. An advantage of this flexibility is that the Dictionary does not need to be programmed with CCLs accessible via supported BCL codes, saving space by using the Dictionary.

Still further, DCL codes may encode not only references to full CCL masks in the Dictionary, but also partial masks. For example, using 8-bit character bytes, many CCLs may contain only symbols from the first 128-character half of the alphabet. For example, this may include just the text characters in ASCII encoding. This CCL may be represented in the dictionary using only a 128-bit mask rather than the 256—bit full mask. This provides even more space savings. When the DCL references a half mask, the half mask may be retrieved from the Dictionary and configured into the indicated half of a cell's DCL mask storage. The remaining half of the 256 bits can be either all 1's or all 0's. This will depend on the DCL encoding and it is understood that either method is useful. For example, the ASCII class [%3C] can be encoded using a 128-bit half mask with bits 37 ('%'), 51 ('3'), and 67 ('C') set to 1 and other bits set to 0, loading this into cell mask storage bits 0 to 127, where the remaining half 128 to 255 are loaded as all 0's. Or, the negated ASCII class [^%3C] can be encoded using a 128-bit half mask with bits 37, 51, and 67 set to 0 and other bits set to 1, loading this into cell mask storage bits 0 to 127, where the remaining half 128 to 255 are loaded as all 1's.

FIG. 4 is a table for Dictionary Class (DCL) codes. In an embodiment of the invention, as shown in the table 400, each DCL code may be 13 bits long. This will comprise a 2-bit Dictionary Format (DF) 410 field and an 11-bit Index Field. For example; if DF=0, this will mean that the Index Field contains a 10-bit BCL; if DF=1, this will mean the Index Field references one of up to 2048 full masks in the Dictionary table; if DF=2 or 3, this means the Index Field references one of up to 2048 half masks in the Dictionary table—these may occupy the same addressable space as the first 1024 full masks. As noted above, the half mask is to be stored in bits 0 to 127 of a cell's DCL mask storage, and the remaining bits of a half mask can be filled with either 1's or 0's. If DF=2 ("ASCII") the remaining bits are filled with zeros. If DF=3

("Negated ASCII"), the remaining bits are filled with ones. If DF=0, the 10-bit BCL code from the Index Field is stored directly in a cell, rather than any DCL mask, and matching against input bytes is as described for BCLs above. If DF>0, a 256-bit DCL mask is stored in the cell, with all or half the bits coming from the Dictionary Table, and within the cell, an input byte selects one bit from the mask and matches if that bit is a '1'.

In an embodiment of the invention, a configurable hardware NFA cell array is implemented to execute a Thompson type matching algorithm. Such an implementation may comprise storage for CCL representations in a frequent CCL table and a CCL Dictionary. The implementation may further comprise enablement for accessing the frequent CCL table using each input symbol and broadcasting the accessed membership vector to the NFA cells along with the input symbols. The implementation may further comprise enablement for accessing the Dictionary using references in NFA instructions and configuring the accessed CCL masks into NFA cells. The implementation may further comprise enablement for comparing CCL representations within NFA cells with input symbols and membership vectors as described. The implementation may further comprise developing or modifying a compiler to translate a set of regular expressions or other rules into an NFA using well known algorithms understood in the art. The implementation may further comprise modifying the compiler to collect CCLs from the regular expressions or other rules or from the NFA, determine which of the collected CCLs fit available fixed CCL codes, select other frequently used CCLs to populate into a configuration for the frequent CCL table, and populate remaining CCLs into a configuration for the Dictionary. The implementation may further comprise modifying the compiler to generate instructions suitable for configuring the cell array to include CCL references of the fixed, frequent or dictionary types as described above.

In an embodiment of the invention, a cell array may utilize CCL references to the fixed, frequent and dictionary types as described above. A cell array may also utilize CCL references to a subset of all three types. It is understood that the complexity of an NFA cell array may dictate, or suggest, differing combinations of the three types of CCL references. For example, a simple NFA may use only a dictionary CCL. Another, more moderately complex NFA may use a combination of all three types of CCL references.

Having a modified NFA cell array implementation as discussed above in conjunction with a modified NFA compiler appropriate to that implementation, a set of regular expressions or other rules to be matched and one or more streams of input symbols, matches to the rules can be determined. First, the NFA compiler would be used to compile the rules into an instruction representation of an NFA appropriate for configuring the cell array. Then, the cell array may be statically configured with these instructions or, if the array is dynamically configurable, the instructions may be made available to the cell array in a form, such as in a memory readable by the array, that it can use to configure cells on demand. Further, the frequent CCL table and Dictionary may be configured with the CCL information determined by the compiler. For each stream of symbols to be scanned, the symbols can then be fed into the array in sequence. The array will use CCL references from the instructions, configured into the NFA cells, to compare CCLs for transitions from active states with input symbols and corresponding membership vectors, on order to detect rule matches when accepting states become active. The cell array will then report match information in some format, such as an identifier of the matched rule and the location of the match in the input stream, which the user or application must then receive.

Figure 5:
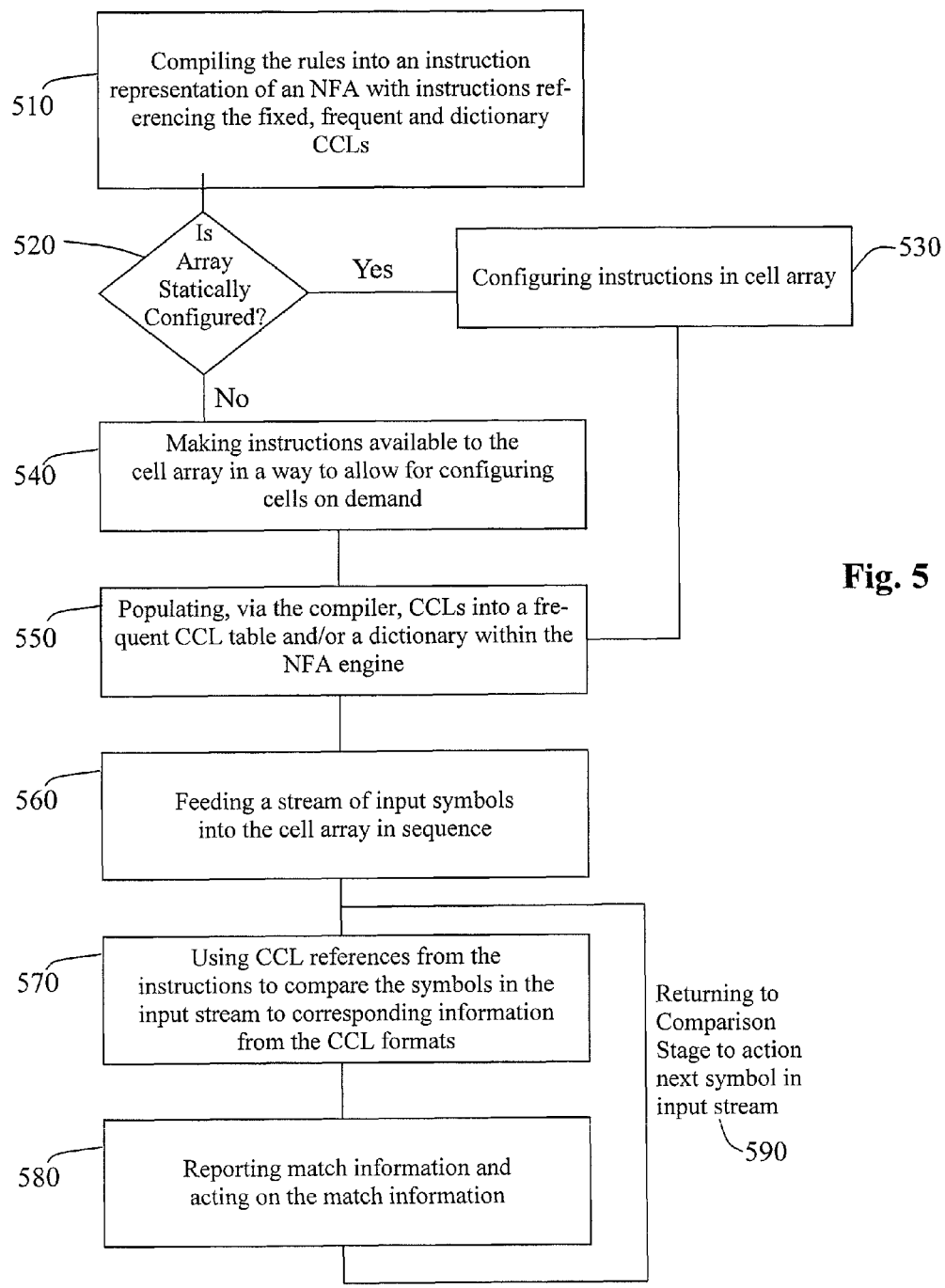
FIG. 5 is a flow diagram of a method of character class matching.

FIG. 5 is a flow diagram of a method of character class matching. A method of character class matching, as noted above, begins by initiating several steps that provide for effective matching. The diagram in FIG. 5 describes an embodiment of the invention from initial compiler steps through the life of an NFA rule being matched, or not. Accordingly, a first step in any NFA is taking a set of rules, whether regular expressions or otherwise, and compiling those rules into an instruction set to be used for the NFA 510. If a corresponding NFA cell array to be used with the NFA is statically implemented with the states of the NFA 520 then the cell array will be configured with the instructions 530. However, if the cell array is dynamically configurable, as described in the '904 patent, the instructions will be made available to the cell array on demand 540. The steps shown as items 520-540 can be logically thought of as the steps of configuring the cell array. After the configuration of the cell array, character classes will be configured into a format as described above 550. The compiler, which will be a compiler capable of configuring the CCLs, will be responsible for this step in the process. It is understood, that while the flow in FIG. 3 shows the CCL configuring step 550 subsequent to that of the implementation steps 520-540, the configuring step may logically occur concurrent with the compilation of instructions from the rules 510. A stream of input symbols will be fed into an NFA scanner, effectively in to the cell array 560. This will occur in the sequence that the input symbols are encountered in the input stream. The CCL encoded by the compiler 550 will be compared to the symbol in the input stream to determine if the symbol is a match for a relevant CCL 570. Match information will be acted on accordingly 580. A match will allow further matching of symbols 590 whereas a failure to match will also continue with inputs from the input stream to begin new matches to the ruleset 590.

Figure 6:
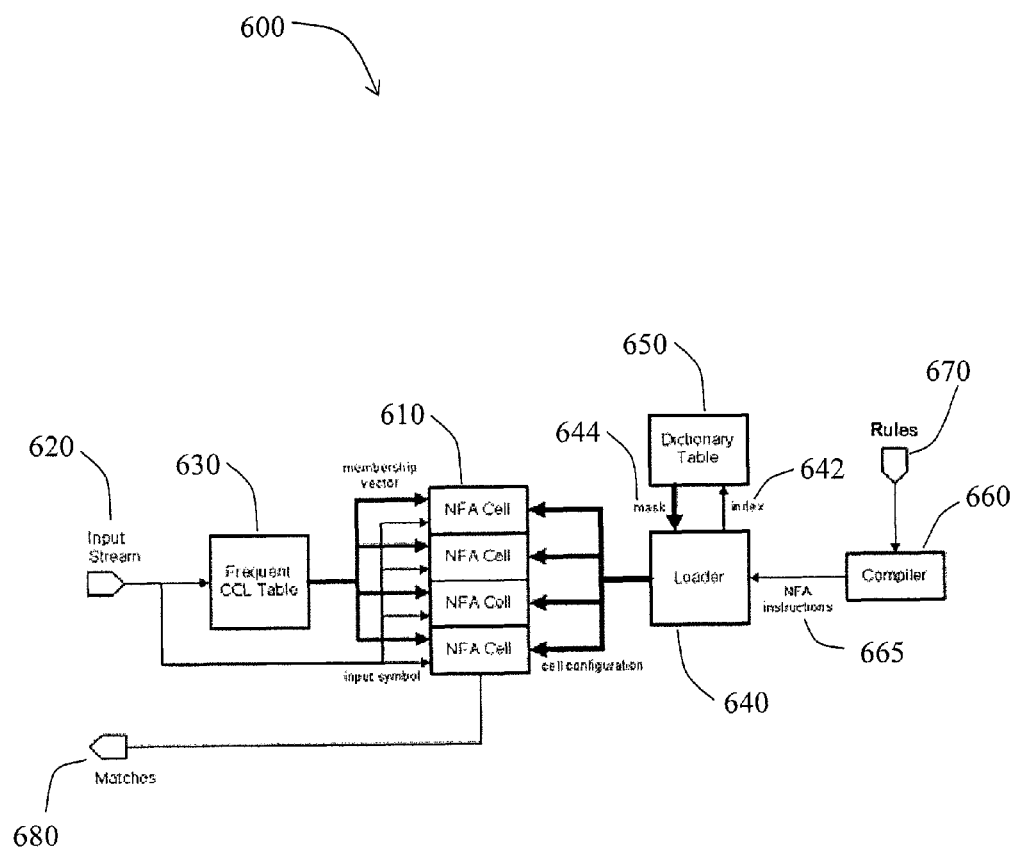
FIG. 6 is a block diagram of a character class matching system.

FIG. 6 is a block diagram of a character class matching system. The matching system 600 comprises a plurality of NFA cells 610. The NFA cells 610 receive inputs from an input stream 620, a frequent CCL table 630 and a loader 640. The frequent CCL table 630 will also receive input from the input stream 620. The loader 640 provides index information 642 to a dictionary table 650 and receives a mask 644 from the dictionary table 650. The loader also is provided an NFA instruction set 665 from a compiler 660. In turn the compiler 660 creates the NFA instruction set 665 based on a set of rules 670, the types of rules being discussed beforehand in this description. As noted in this description, encodings used to facilitate fixed CCLs may be comparable with input symbols using low-cost cell logic. The fixed CCL mechanisms are not shown in the FIG. 6 representation but it is understood that all three of the CCL methods and mechanisms are present.

As shown, the input stream 620 will provide inputs to both the frequent CCL table 630 and the NFA cells 610. The frequent CCL table 630 uses the input symbol 620 to access a particular row 120 indicated by the value of the input symbol 620. A corresponding membership vector is retrieved correspondingly. The membership vector is then broadcast, along with the input symbol 620, to all of the NFA cells 610 in the array. A test is made to determine if the input symbol 620 is a member of a relevant CCL by looking at the appropriate bit, indicated by the CCL under consideration, of the membership vector.

As shown, the loader 640 receives masks from a dictionary table 650. An NFA instruction is decoded when an NFA cell 610 is configured. A dictionary class (DCL) is used to obtain a mask from the dictionary table 650 that corresponds. The obtained mask from the dictionary table 650 will be stored directly in the NFA cell 610 by the loader 640. The NFA cell 610 compares the dictionary class with an input symbol from the input stream 620 as an index to select one corresponding bit from the mask. Whether the bit selected in a '1' or a '0' determines if the input symbol is a member of the class. Positive CCL comparison results, from the frequent CCL tests, from the dictionary mask comparisons, and from the fixed CCL tests, trigger state transition signals among the NFA Cells 610 when a rule is partially satisfied, or when a rule is fully satisfied are reported out of the NFA cells as rule matches 680.

Figure 7:
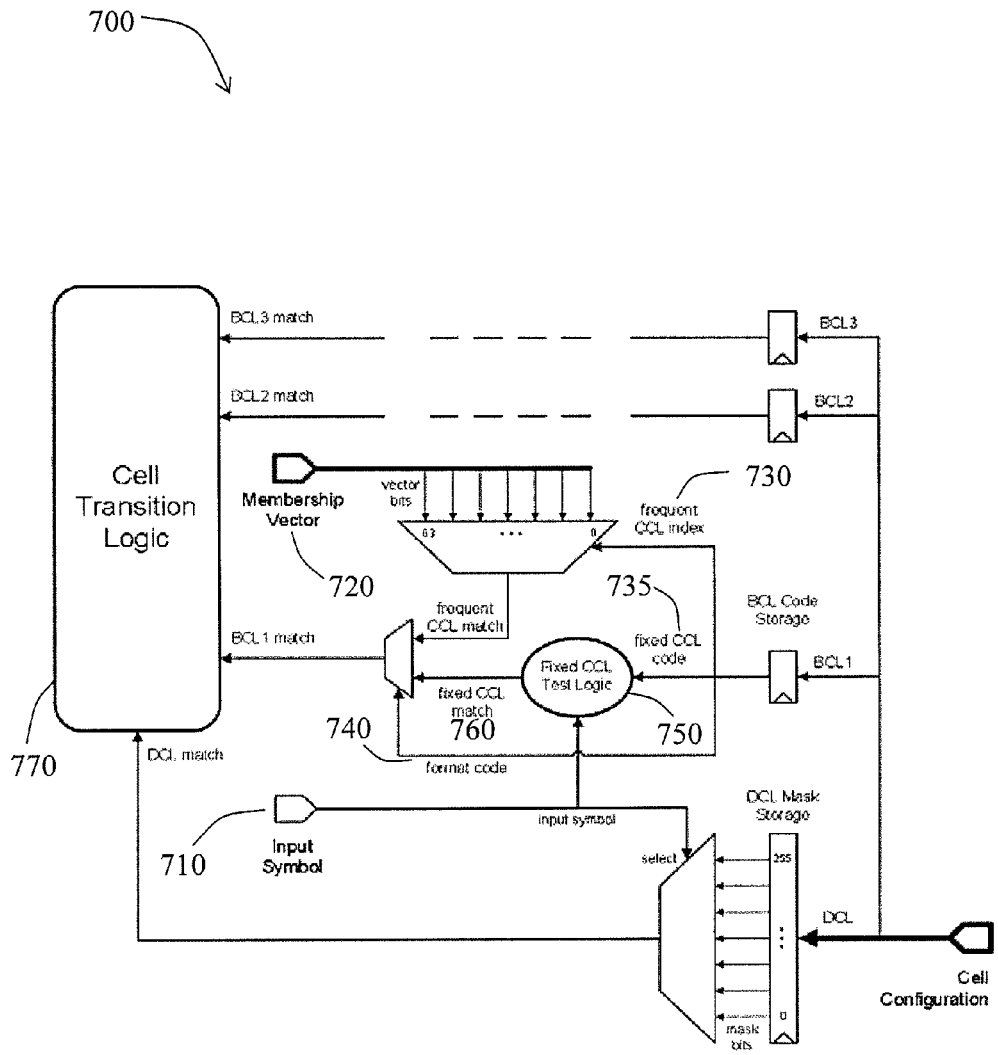
FIG. 7 is a diagram of a cell for character class matching.

FIG. 7 is a diagram of a cell for character class matching. As noted elsewhere, each cell may be enabled to perform fixed CCL tests, frequent CCL tests and dictionary table CCL tests. They may also be enabled to perform some subset of those three. In the FIG. 7, a 256-bit DCL mask may get stored in the cell. As noted, this may be at the time of cell configuration. Small BCL codes may be stored in the cell, likewise. There may be room for multiple BCL codes. Input symbols 710 are used in the cell 700 to select a bit from the DCL mask to determine if the input symbol 710 matches the DCL. A frequent CCL index 730 is extractable from the BCL code. The CCL index 730 is used to select a bit from the membership vector 720 to determine a match of the frequent CCL. A fixed CCL code 735 is extractable from the BCL code. The fixed CCL code 735 is compared with an input symbol 710 by fixed logic 750 to determine a fixed CCL match 760. A format code 740 is extractable from the BCL code. The format code is used to indicate whether the cell should use fixed CCL or frequent CCL matching. This format code 740, as well as another code, may be used to select between BCL and DCL matching. The results of DCL and BCL (fixed and frequent) are used by the cell transition logic 770 to determine state transitions in the NFA cell array. These state transitions may be intra- or inter-cell transitions depending on the configuration of the array. Although the FIG. 7 does not indicate the use of negate and caseless flags, it is understood that the operation of those flags are as described elsewhere in this description.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of matching character classes (CCLs) from an NFA in an NFA cell array, said method comprising:
    encoding information of at least one frequent CCL in a frequent CCL table;
    accessing a location in the frequent CCL table indicated by an input symbol;
    broadcasting the content of that location, which is a membership vector, to each cell in the NFA cell array;
    broadcasting the input symbol to each cell in the NFA cell array; and
    in an NFA cell, using the encoded frequent CCL to select a bit in the membership vector, said bit indicating membership in the frequent CCL.

2. The method of claim 1, said method further comprising:
    encoding a plurality of fixed CCLs; and
    in an NFA cell, using the encoded fixed CCL to test whether an input symbol is a member of a corresponding fixed CCL.

3. The method of claim 2, wherein the encoding of the fixed CCLs comprises encoding at least one code flag.

4. The method of claim 3, wherein said at least one code flag comprises a negate flag and a caseless flag.

5. The method of claim 2, wherein the encoding of the frequent CCLs and encoding of fixed CCLs comprises:
    using byte class codes (BCLs) comprising a byte field and at least one modification flag; and
    storing said BCLs in an NFA cell during cell configuration.

6. The method of claim 1, further comprising encoding a dictionary table.

7. The method of claim 6, wherein said dictionary table is formatted as a plurality of bit masks, said bits being stored in an NFA cell during cell configuration.

8. The method of claim 7, wherein the cell compares the stored bit mask with an input symbol by using the symbol value as an index to select one corresponding bit from the mask.

9. The method of claim 8, said method further comprising:
    encoding a plurality of fixed CCLs; and
    in an NFA cell, using the encoded fixed CCL to test whether an input symbol is a member of a corresponding fixed CCL.

10. The method of claim 9, wherein the encoding of the fixed CCLs comprises encoding at least one code flag.

11. The method of claim 10, wherein said at least one code flag comprises a negate flag and a caseless flag.

12. The method of claim 9, wherein the encoding of the frequent CCLs and encoding of fixed CCLs comprises:
    using byte class codes (BCLs) comprising a byte field and at least one modification flag; and
    storing said BCLs in an NFA cell during cell configuration.

13. A system of matching character classes (CCLs) from an NFA in an NFA cell array, said system comprising:
    a frequent CCL table;
    an input stream comprising a plurality of input symbols;
    a loader enabled to receive NFA instructions and configure the NFA cells; and
    a plurality of NFA cells enabled to receive information from the frequent CCL table, loader and input stream;
    wherein the input stream provides symbols to the frequent CCL table and the NFA cells, the frequent CCL table utilizes the input symbol to access a membership vector, the membership vector and symbols from the input stream are broadcast to each cell in the NFA cell array, and a bit from the membership vector is selected to determine membership in a CCL.

14. The system of claim 13, said system further comprising a dictionary table enabled to provide a bit mask to the loader, each bit mask corresponding to a specific character class;
    wherein the loader stores a mask obtained from the dictionary table directly in an NFA cell at configuration of the cell and the NFA cell compares the dictionary class with an input symbol, said input acting as an index to select one corresponding bit from the mask.

15. The system of claim 14, said system further comprising a plurality of fixed character classes wherein cell logic is utilized to compare fixed CCLs with input symbols.

16. The system of claim 15, wherein said fixed character classes are modifiable by at least a negate code flag and a caseless code flag.

* * * * *